United States Patent
Eisen

(10) Patent No.: US 10,999,298 B2
(45) Date of Patent: May 4, 2021

(54) METHOD AND SYSTEM FOR IDENTIFYING USERS AND DETECTING FRAUD BY USE OF THE INTERNET

(75) Inventor: Ori Eisen, Scottsdale, AZ (US)

(73) Assignee: The 41st Parameter, Inc., Scottsdale, CA (US)

( * ) Notice: Subject to any disclaimer, the term of this patent is extended or adjusted under 35 U.S.C. 154(b) by 0 days.

(21) Appl. No.: 12/892,868

(22) Filed: Sep. 28, 2010

(65) Prior Publication Data

US 2011/0082768 A1  Apr. 7, 2011

Related U.S. Application Data

(63) Continuation-in-part of application No. 11/241,739, filed on Sep. 29, 2005, now Pat. No. 7,853,533, which is a continuation-in-part of application No. 10/791,439, filed on Mar. 2, 2004, now abandoned.

(60) Provisional application No. 60/694,768, filed on Jun. 27, 2005.

(51) Int. Cl.
*H04L 29/06* (2006.01)
*G06Q 30/06* (2012.01)

(52) U.S. Cl.
CPC ..... *H04L 63/1408* (2013.01); *G06Q 30/0609* (2013.01); *H04L 63/1483* (2013.01); *H04L 2463/102* (2013.01)

(58) Field of Classification Search
USPC .......................................................... 705/64
See application file for complete search history.

(56) References Cited

U.S. PATENT DOCUMENTS

| | | | |
|---|---|---|---|
| 4,805,222 | A | 2/1989 | Young et al. |
| 4,912,761 | A | 3/1990 | Tan et al. |
| 4,924,387 | A | 5/1990 | Jeppesen |
| 5,184,849 | A | 2/1993 | Taylor |
| 5,491,735 | A | 2/1996 | Hsieh |
| 5,519,827 | A | 5/1996 | Mizushima |
| 5,521,907 | A | 5/1996 | Ennis, Jr. |
| 5,557,686 | A | 9/1996 | Brown et al. |
| 5,583,380 | A | 12/1996 | Larsen et al. |

(Continued)

FOREIGN PATENT DOCUMENTS

| | | |
|---|---|---|
| EP | 0418144 A1 | 3/1991 |
| EP | 0 645 692 | 3/1995 |

(Continued)

OTHER PUBLICATIONS

Ron White, How computers work (Year: 2003).*

(Continued)

*Primary Examiner* — Zeshan Qayyum
*Assistant Examiner* — Yingying Zhou
(74) *Attorney, Agent, or Firm* — Knobbe, Martens, Olson & Bear, LLP

(57) ABSTRACT

A method and system for detecting and preventing Internet fraud in online transactions by utilizing and analyzing a number of parameters to uniquely identify a computer user and potential fraudulent transaction through predictive modeling. The method and system uses a delta of time between the clock of the computer used by the actual fraudulent use and the potentially fraudulent user and the clock of the server computer in conjunction with personal information and/or non-personal information, preferably the Browser ID.

20 Claims, 10 Drawing Sheets

(56) References Cited

U.S. PATENT DOCUMENTS

| | | |
|---|---|---|
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosen |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 * | 1/2004 | Boulware ............... 705/66 |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 * | 5/2005 | Wood et al. ............. 726/8 |
| 6,895,507 B1 | 5/2005 | Teppler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-LeMair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |

(56) References Cited

U.S. PATENT DOCUMENTS

| | | |
|---|---|---|
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,778,846 B2 | 8/2010 | Suresh et al. |
| 7,813,937 B1 | 10/2010 | Pathria et al. |
| 7,813,944 B1 | 10/2010 | Luk et al. |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,660,539 B2 | 2/2014 | Khambete et al. |
| 8,676,684 B2 | 3/2014 | Newman et al. |
| 8,683,561 B2 | 3/2014 | Utin |
| 8,688,543 B2 | 4/2014 | Dominquez |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |

(56) References Cited

U.S. PATENT DOCUMENTS

| | | |
|---|---|---|
| 9,060,012 B2 | 6/2015 | Eisen |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,191,370 B2 | 11/2015 | Barber et al. |
| 9,196,004 B2 | 11/2015 | Eisen |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,514,248 B1 | 12/2016 | Guan et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,633,201 B1 | 4/2017 | Katz |
| 9,703,983 B2 | 7/2017 | Eisen et al. |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,948,629 B2 | 4/2018 | Eisen |
| 9,990,631 B2 | 6/2018 | Eisen |
| 10,021,099 B2 | 7/2018 | Eisen et al. |
| 10,089,679 B2 | 10/2018 | Eisen |
| 10,091,312 B1 | 10/2018 | Khanwalkar et al. |
| 10,339,306 B1 | 7/2019 | Katz |
| 10,341,344 B2 | 7/2019 | Eisen et al. |
| 10,395,252 B2 | 8/2019 | Eisen |
| 10,417,637 B2 | 9/2019 | Eisen |
| 10,453,066 B2 | 10/2019 | Eisen |
| 10,535,093 B2 | 1/2020 | Eisen |
| 10,616,201 B2 | 4/2020 | Eisen |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | Van Der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | John, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1* | 4/2003 | Rosen .................. 713/187 |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1* | 9/2003 | Feigenbaum .................. 705/64 |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Eisenberg et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1* | 2/2005 | Eisenberg et al. .............. 705/26 |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0154676 A1* | 7/2005 | Ronning et al. ................. 705/44 |
| 2005/0185225 A1 | 8/2005 | Brawn et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0216278 A1 | 9/2005 | Eisen |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |

(56) References Cited

U.S. PATENT DOCUMENTS

| | | |
|---|---|---|
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1* | 12/2006 | Helsper .................. G06Q 30/06 235/382 |
| 2007/0011078 A1 | 1/2007 | Jain et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1* | 8/2007 | Rice et al. .................... 709/225 |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0234070 A1 | 10/2007 | Horning et al. |
| 2007/0234409 A1 | 10/2007 | Eisen |
| 2007/0239604 A1 | 10/2007 | O'Connell et al. |
| 2007/0239606 A1 | 10/2007 | Eisen |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0046562 A1 | 2/2008 | Butler |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde |
| 2008/0104684 A1 | 5/2008 | Lunde |
| 2008/0120195 A1 | 5/2008 | Shakkarwar |
| 2008/0120214 A1 | 5/2008 | Steele et al. |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0174603 A1 | 7/2008 | Brass et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0018940 A1 | 1/2009 | Wang et al. |
| 2009/0024971 A1 | 1/2009 | Willner et al. |
| 2009/0037213 A1 | 2/2009 | Eisen |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0070664 A1 | 3/2009 | Gavin et al. |
| 2009/0083184 A1 | 3/2009 | Eisen |
| 2009/0089869 A1 | 4/2009 | Varghese |
| 2009/0106413 A1 | 4/2009 | Salo |
| 2009/0138590 A1 | 5/2009 | Lee et al. |
| 2009/0157417 A1 | 6/2009 | Bradley et al. |
| 2009/0164269 A1 | 6/2009 | Gupta et al. |
| 2009/0177692 A1 | 7/2009 | Chagoly et al. |
| 2009/0183010 A1 | 7/2009 | Schnell et al. |
| 2009/0205031 A1 | 8/2009 | Sato et al. |
| 2009/0222308 A1 | 9/2009 | Zoldi et al. |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2010/0004965 A1 | 1/2010 | Eisen |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0070606 A1 | 3/2010 | Shenfield et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228625 A1 | 9/2010 | Priyadarshan et al. |
| 2010/0228638 A1 | 9/2010 | Mikan et al. |
| 2010/0257065 A1 | 10/2010 | Gupta et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0321296 A1 | 12/2010 | Gross |
| 2010/0333170 A1 | 12/2010 | Cox et al. |
| 2011/0022483 A1 | 1/2011 | Hammad |
| 2011/0022517 A1 | 1/2011 | Hammad |
| 2011/0035302 A1 | 2/2011 | Martell et al. |
| 2011/0047072 A1 | 2/2011 | Ciurea |
| 2011/0112901 A1 | 5/2011 | Fried et al. |
| 2011/0113388 A1 | 5/2011 | Eisen et al. |
| 2011/0161228 A1 | 6/2011 | Suzuki et al. |
| 2011/0173281 A1 | 7/2011 | Smith |
| 2011/0184778 A1 | 7/2011 | Graepel et al. |

(56) References Cited

U.S. PATENT DOCUMENTS

| | | |
|---|---|---|
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0264612 A1 | 10/2011 | Ryman-Tubb et al. |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0041841 A1 | 2/2012 | Hu et al. |
| 2012/0054136 A1 | 3/2012 | Maulik |
| 2012/0054847 A1 | 3/2012 | Schultz et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096557 A1 | 4/2012 | Britton et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0174223 A1 | 7/2012 | Eisen |
| 2012/0179558 A1 | 7/2012 | Fischer |
| 2012/0197981 A1 | 8/2012 | Chan |
| 2012/0204262 A1 | 8/2012 | Thomas et al. |
| 2012/0215896 A1 | 8/2012 | Johannsen |
| 2012/0216282 A1 | 8/2012 | Pappu et al. |
| 2012/0221470 A1 | 8/2012 | Lyon |
| 2012/0222111 A1 | 8/2012 | Oliver et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0278127 A1 | 11/2012 | Kirakosyan et al. |
| 2012/0295580 A1 | 11/2012 | Corner |
| 2012/0297380 A1 | 11/2012 | Colbert et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0330787 A1 | 12/2012 | Hanson et al. |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0103482 A1 | 4/2013 | Song et al. |
| 2013/0103629 A1 | 4/2013 | Vaiciulis et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0144539 A1 | 6/2013 | Allen et al. |
| 2013/0148525 A1 | 6/2013 | Cuadra Sanchez et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0226717 A1 | 8/2013 | Ahluwalia et al. |
| 2013/0273879 A1 | 10/2013 | Eisen et al. |
| 2013/0339186 A1 | 12/2013 | French |
| 2014/0032902 A1 | 1/2014 | Agrawal et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0046989 A1 | 2/2015 | Oberheide et al. |
| 2015/0106270 A1 | 4/2015 | Burrell et al. |
| 2015/0127825 A1 | 5/2015 | Johannsen |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0221019 A1 | 8/2015 | Eisen |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0350856 A1 | 12/2015 | Circosta et al. |
| 2016/0019546 A1 | 1/2016 | Eisen |
| 2016/0034954 A1 | 2/2016 | Tollinger et al. |
| 2016/0125461 A1 | 5/2016 | Sivaramakrishnan et al. |
| 2016/0246581 A1 | 8/2016 | Jimenez et al. |
| 2016/0321701 A1 | 11/2016 | Tollinger et al. |
| 2017/0039571 A1 | 2/2017 | Eisen |
| 2017/0142106 A1 | 5/2017 | Eisen et al. |
| 2018/0089459 A1 | 3/2018 | Eisen et al. |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |
| 2019/0028472 A1 | 1/2019 | Eisen |
| 2019/0066192 A1 | 2/2019 | Eisen |
| 2019/0356659 A1 | 11/2019 | Eisen et al. |
| 2020/0005315 A1 | 1/2020 | Eisen |
| 2020/0013064 A1 | 1/2020 | Eisen |
| 2020/0034845 A1 | 1/2020 | Eisen |

FOREIGN PATENT DOCUMENTS

| | | |
|---|---|---|
| EP | 0923039 A1 | 6/1999 |
| EP | 1 067 792 | 1/2001 |
| EP | 1 209 935 | 5/2002 |
| EP | 1256911 A1 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| GB | 2 485 241 | 5/2012 |
| GB | 2 491 101 | 11/2012 |
| GB | 2 492 604 | 1/2013 |
| GB | 2 494 098 | 3/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535124 | 8/2008 |
| JP | 2008-243008 | 10/2008 |
| JP | 2008-257434 | 10/2008 |
| JP | 2008-269229 | 11/2008 |

(56) References Cited

FOREIGN PATENT DOCUMENTS

| | | |
|---|---|---|
| JP | 4202314 | 12/2008 |
| JP | 2009-048538 | 3/2009 |
| JP | 2009-122880 | 6/2009 |
| JP | 2009-175984 | 8/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159307 | 8/2011 |
| JP | 2012-234503 | 11/2012 |
| JP | 5191376 | 5/2013 |
| JP | 5216932 | 6/2013 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 99/050775 | 10/1999 |
| WO | WO 01/11450 A1 | 2/2001 |
| WO | WO 01/033520 | 5/2001 |
| WO | WO 01/95550 A2 | 12/2001 |
| WO | WO 01/097134 | 12/2001 |
| WO | WO 02/001462 | 1/2002 |
| WO | WO 02/071176 | 9/2002 |
| WO | WO 02/091226 A1 | 11/2002 |
| WO | WO 03/017155 | 2/2003 |
| WO | WO 03/025868 A1 | 3/2003 |
| WO | WO 03/075197 A2 | 9/2003 |
| WO | WO 03/075197 A3 | 12/2003 |
| WO | WO 02/037219 A9 | 5/2004 |
| WO | WO 2004/038997 A1 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/142722 | 9/2013 |
| WO | WO 2014/022813 | 2/2014 |
| WO | WO 2014/078569 | 5/2014 |
| WO | WO 2018/129373 | 7/2018 |
| WO | WO 2018/151822 | 8/2018 |

OTHER PUBLICATIONS

Rn White, How Computers Work (Year: 2013).*
U.S. Appl. No. 12/732,034, filed Mar. 25, 2010, Eisen.
Derfler, et al. How Network Work. Millennium Ed., Que Corporation. Indianapolis. IN. 2000.
European search report and written opinion dated Nov. 15, 2010 for Application No. 08165224.0.
Gralla, Preston. How the Internet Works. Millennium Ed., Que Corporation. Indianapolis, IN 1999.
International search report dated Oct. 29, 2007 for PCT Application No. US2005/35532.
International search report dated Jul. 3, 2008 for PCT Application No. US2007/65776.
Kohno, et al. Remote Physical Device Fingerprinting. 2005 IEEE Syposium on Security and Privacy (IEEE S&P 2005); May 8-11, 2005; Oakland, California, U.S.A. 16 pages.
Manavoglu, et al. Probabilistic user behavior models. Data Mining. 2003; 203-210.
White, Ron. How Computers Work. Millennium Ed., Que Corporation. Indianapolis, IN. 1999.
European search report dated Dec. 23, 2011 for Application No. 5818903.6.
Notice of allowance dated Dec. 26, 2014 for U.S. Appl. No. 11/862,165.
U.S. Appl. No. 14/473,818, filed Aug. 29, 2014, Eisen.
Notice of allowance dated Jan. 3, 2012 for U.S. Appl. No. 11/694,882.
Notice of allowance dated Apr. 30, 2014 for U.S. Appl. No. 13/414,678.
Notice of allowance dated Jun. 10, 2014 for U.S. Appl. No. 12/248,867.
Notice of allowance dated Jun. 24, 2010 for U.S. Appl. No. 11/241,739.
Office action dated Sep. 19, 2014 for U.S. Appl. No. 12/732,034.
Office action dated Oct. 2, 2013 for U.S. Appl. No. 12/496,572.
Office action dated Mar. 13, 2014 for U.S. Appl. No. 12/732,034.
Office action dated Mar. 28, 2014 for U.S. Appl. No. 11/862,165.
Office action dated Jan. 6, 2010 for U.S. Appl. No. 11/241,739.
Office action dated Feb. 24, 2009 for U.S. Appl. No. 11/694,882.
Office action dated Mar. 3, 2008 for U.S. Appl. No. 11/241,739.
Office action dated Mar. 4, 2010 for U.S. Appl. No. 12/248,867.
Office action dated Mar. 9, 2009 for U.S. Appl. No. 11/241,739.
Office action dated Mar. 26, 2013 for U.S. Appl. No. 12/248,867.
Office action dated Mar. 27, 2013 for U.S. Appl. No. 12/496,572.
Office action dated Apr. 16, 2010 for U.S. Appl. No. 11/862,165.
Office action dated Apr. 20, 2012 for U.S. Appl. No. 12/732,034.
Office action dated May 9, 2008 for U.S. Appl. No. 10/791,439.
Office action dated Jun. 1, 2011 for U.S. Appl. No. 11/694,882.
Office action dated Jun. 11, 2008 for U.S. Appl. No. 11/694,882.
Office action dated Jul. 1, 2009 for U.S. Appl. No. 11/241,739.
Office action dated Jul. 7, 2009 for U.S. Appl. No. 11/862,165.
Office action dated Aug. 23, 2010 for U.S. Appl. No. 11/694,882.
Office action dated Sep. 16, 2008 for U.S. Appl. No. 11/241,739.
Office action dated Nov. 15, 2012 for U.S. Appl. No. 12/732,034.
Office action dated Nov. 22, 2010 for U.S. Appl. No. 12/248,867.
Office action dated Dec. 7, 2007 for U.S. Appl. No. 10/791,439.
Office action dated Dec. 23, 2009 for U.S. Appl. No. 11/694,882.
Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
TechWeb, "Wells Fargo Intros Anti-Theft Alerts", http://www.techweb.com/wire/166404177, Aug. 1, 2005, pp. 1.
"UPIC Marketing Guide—The Clearing House", http://www.upic.com/infofiles/UPIC_Marketing_Guide.pdf, as printed Dec. 19, 2006. pp. 1-16.
Official Communication in European Patent Application No. 05818903.6, dated Mar. 18, 2014.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 8159110.9, dated Oct. 27, 2008.

(56) References Cited

OTHER PUBLICATIONS

Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Supplementary European Search Report for Application No. EP09735653, dated Dec. 16, 2011.
Official Communication for Application No. EP09735653, dated Jan. 4, 2013.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 19, 2015.
Office action dated Sep. 10, 2013 for U.S. Appl. No. 13/414,678.
Co-pending U.S. Appl. No. 14/826,107, filed Aug. 13, 2015.
Notice of allowance dated Aug. 5, 2015 for U.S. Appl. No. 14/473,818.
U.S. Appl. No. 10/791,439, 2006/0010072, Method and System for Identifying Users and Detecting Fraud by Use of the Internet, filed Mar. 2, 2004.
U.S. Appl. No. 11/241,739, U.S. Pat. No. 7,853,533, Method and System for Identifying Users and Detecting Fraud by Use of the Internet, filed Sep. 29, 2005.
U.S. Appl. No. 12/248,867, U.S. Pat No. 8,862,514, Method and System for Identifying Users and Detecting Fraud by Use of the Internet, filed Oct. 9, 2008.
Official Communication in European Patent Application No. 05818903.6, dated Jul. 18, 2017.
Provisional Application as filed in U.S. Appl. No. 61/324,312, dated Apr. 15, 2010 in 15 pages.
Notice of allowance dated May 28, 2015 for U.S. Appl. No. 12/732,034.
Notice of allowance dated Jul. 1, 2015 for U.S. Appl. No. 12/732,034.
Office action dated Mar. 19, 2015 for U.S. Appl. No. 12/496,572.
Office action dated Apr. 22, 2015 for U.S. Appl. No. 14/473,818.
Summons to Attend Oral Proceedings received in European Application No. EP09735653, dated Oct. 7, 2016.
Official Communication in European Patent Application No. 19181057.1, dated Sep. 17, 2019.
The Knightmare, "Secrets of a Super Hacker", Loompanics Unlimited, Port Townsend, Washington, 1994, pp. 233.
Official Communication in European Patent Application No. 19189189.4, dated Jan. 21, 2020.

* cited by examiner

| TimeDiff | ORDERTIME | CUSTLOCAL TIME | EMAIL | BROWSERID | CARD HOLDER | CARD NUMBER |
|---|---|---|---|---|---|---|
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 595 | 11-Apr-02 | 12-Apr-02 | NEHA@NEHA.COM | MOZILLA/4.0 (COMPATIBLE; MSIE 5.0; WINDOWS 98; DIGEXT) | ORLEANS | XXXXXXXXXXXXXXXX |
| 595 | 11-Apr-02 | 12-Apr-02 | NEHA@NEHA.COM | MOZILLA/4.0 (COMPATIBLE; MSIE 5.0; WINDOWS 98; DIGEXT) | ORLEANS | XXXXXXXXXXXXXXXX |
| 603 | 19-Apr-02 | 19-Apr-02 | L.COM | MOZILLA/4.0 (COMPATIBLE; MSIE 5.0; WINDOWS 98; DIGEXT) | WICHMAN | XXXXXXXXXXXXXXXX |
| 603 | 19-Apr-02 | 19-Apr-02 | L.COM | MOZILLA/4.0 (COMPATIBLE; MSIE 5.0; WINDOWS 98; DIGEXT) | WICHMAN | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 595 | 08-Apr-02 | 09-Apr-02 | T | MOZILLA/4.0 (COMPATIBLE; MSIE 5.0; WINDOWS 98; DIGEXT) | TOYODA | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19rApr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 592 | 24-May-02 | 25-May-02 | M | MOZILLA/4.0 (COMPATIBLE; MSIE 5.0; WINDOWS 98; DIGEXT) | AHMED | XXXXXXXXXXXXXXXX |
| 592 | 24-May-02 | 25-May-02 | M | MOZILLA/4.0 (COMPATIBLE; MSIE 5.0; WINDOWS 98; DIGEXT) | AHMED | XXXXXXXXXXXXXXXX |
| 599 | 21-May-02 | 21-May-02 | | MOZILLA/4.0 (COMPATIBLE; MSIE 5.0; WINDOWS 98; DIGEXT) | TRELOAR | XXXXXXXXXXXXXXXX |
| 600 | 09-Jun-02 | 10-Jun-02 | CUTIE@CUTIE.COM | MOZILLA/4.0 (COMPATIBLE; MSIE 5.0; WINDOWS 98; DIGEXT) | HARRISON | XXXXXXXXXXXXXXXX |
| 600 | 09-Jun-02 | 10-Jun-02 | CUTIE@CUTIE.COM | MOZILLA/4.0 (COMPATIBLE; MSIE 5.0; WINDOWS 98; DIGEXT) | HARRISON | XXXXXXXXXXXXXXXX |
| 600 | 09-Jun-02 | 10-Jun-02 | CUTIE@CUTIE.COM | MOZILLA/4.0 (COMPATIBLE; MSIE 5.0; WINDOWS 98; DIGEXT) | HARRISON | XXXXXXXXXXXXXXXX |

Alphabetical Index of Time Zone Abbreviations

Note: Some listed abbreviations are not unique and have several entries while other time zones have many common names and are listed as well.

| Abbreviation | Full name | Location | Time zone |
|---|---|---|---|
| A | Alpha Time Zone | Military | UTC + 1 hour |
| ACDT | Australian Central Daylight Time | Australia | UTC + 10:30 hours |
| ACST | Australian Central Standard Time | Australia | UTC + 9:30 hours |
| ADT | Atlantic Daylight Time | North America | UTC - 3 hours |
| AEDT | Australian Eastern Daylight Time | Australia | UTC + 11 hours |
| AEST | Australian Eastern Standard Time | Australia | UTC + 10 hours |
| AKDT | Alaska Daylight Time | North America | UTC - 8 hours |
| AKST | Alaska Standard Time | North America | UTC - 9 hours |
| AST | Atlantic Standard Time | North America | UTC - 4 hours |
| AWST | Australian Western Standard Time | Australia | UTC + 8 hours |
| B | Bravo Time Zone | Military | UTC + 2 hours |
| BST | British Summer Time | Europe | UTC + 1 hour |
| C | Charlie Time Zone | Military | UTC + 3 hours |
| CDT | Central Daylight Time | Australia | UTC + 10:30 hours |
| CDT | Central Daylight Time | North America | UTC - 5 hours |
| CEDT | Central European Daylight Time | Europe | UTC + 2 hours |
| CEST | Central European Summer Time | Europe | UTC + 2 hours |
| CET | Central European Time | Europe | UTC + 1 hour |
| CST | Central Standard Time | Australia | UTC + 9:30 hours |
| CST | Central Standard Time | North America | UTC - 6 hours |
| CXT | Christmas Island Time | Australia | UTC + 7 hours |
| D | Delta Time Zone | Military | UTC + 4 hours |
| E | Echo Time Zone | Military | UTC + 5 hours |
| EDT | Eastern Daylight Time | Australia | UTC + 11 hours |
| EDT | Eastern Daylight Time | North America | UTC - 4 hours |
| EEDT | Eastern European Daylight Time | Europe | UTC + 3 hours |
| EEST | Eastern European Summer Time | Europe | UTC + 3 hours |

FIG. 3-A

| | | | |
|---|---|---|---|
| EET | Eastern European Time | Europe | UTC + 2 hours |
| EST | Eastern Standard Time | Australia | UTC + 10 hours |
| EST | Eastern Standard Time | North America | UTC - 5 hours |
| F | Foxtrot Time Zone | Military | UTC + 6 hours |
| G | Golf Time Zone | Military | UTC + 7 hours |
| GMT | Greenwich Mean Time | Europe | UTC |
| H | Hotel Time Zone | Military | UTC + 8 hours |
| HAA | Heure Avancée de l'Atlantique | North America | UTC - 3 hours |
| HAC | Heure Avancée du Centre | North America | UTC - 5 hours |
| HADT | Hawaii-Aleutian Daylight Time | North America | UTC - 9 hours |
| HAE | Heure Avancée de l'Est | North America | UTC - 4 hours |
| HAP | Heure Avancée du Pacifique | North America | UTC - 7 hours |
| HAR | Heure Avancée des Rocheuses | North America | UTC - 6 hours |
| HAST | Hawaii-Aleutian Standard Time | North America | UTC - 10 hours |
| HAT | Heure Avancée de Terre-Neuve | North America | UTC - 2:30 hours |
| HAY | Heure Avancée du Yukon | North America | UTC - 8 hours |
| HNA | Heure Normale de l'Atlantique | North America | UTC - 4 hours |
| HNC | Heure Normale du Centre | North America | UTC - 6 hours |
| HNE | Heure Normale de l'Est | North America | UTC - 5 hours |
| HNP | Heure Normale du Pacifique | North America | UTC - 8 hours |
| HNR | Heure Normale des Rocheuses | North America | UTC - 7 hours |
| HNT | Heure Normale de Terre-Neuve | North America | UTC - 3:30 hours |
| HNY | Heure Normale du Yukon | North America | UTC - 9 hours |
| I | India Time Zone | Military | UTC + 9 hours |
| IST | Irish Summer Time | Europe | UTC + 1 hour |
| K | Kilo Time Zone | Military | UTC + 10 hours |
| L | Lima Time Zone | Military | UTC + 11 hours |
| M | Mike Time Zone | Military | UTC + 12 hours |
| MDT | Mountain Daylight Time | North America | UTC - 6 hours |
| MESZ | Mitteleuropäische Sommerzeit | Europe | UTC + 2 hours |
| MEZ | Mitteleuropäische Zeit | Europe | UTC + 1 hour |
| MST | Mountain Standard Time | North America | UTC - 7 hours |

FIG. 3-B

| | | | |
|---|---|---|---|
| N | November Time Zone | Military | UTC - 1 hour |
| NDT | Newfoundland Daylight Time | North America | UTC - 2:30 hours |
| NFT | Norfolk (Island) Time | Australia | UTC + 11:30 hours |
| NST | Newfoundland Standard Time | North America | UTC - 3:30 hours |
| O | Oscar Time Zone | Military | UTC - 2 hours |
| P | Papa Time Zone | Military | UTC - 3 hours |
| PDT | Pacific Daylight Time | North America | UTC - 7 hours |
| PST | Pacific Standard Time | North America | UTC - 8 hours |
| Q | Quebec Time Zone | Military | UTC - 4 hours |
| R | Romeo Time Zone | Military | UTC - 5 hours |
| S | Sierra Time Zone | Military | UTC - 6 hours |
| T | Tango Time Zone | Military | UTC - 7 hours |
| U | Uniform Time Zone | Military | UTC - 8 hours |
| UTC | Coordinated Universal Time | Europe | UTC |
| V | Victor Time Zone | Military | UTC - 9 hours |
| W | Whiskey Time Zone | Military | UTC - 10 hours |
| WEDT | Western European Daylight Time | Europe | UTC + 1 hour |
| WEST | Western European Summer Time | Europe | UTC + 1 hour |
| WET | Western European Time | Europe | UTC |
| WST | Western Standard Time | Australia | UTC + 8 hours |
| X | X-ray Time Zone | Military | UTC - 11 hours |
| Y | Yankee Time Zone | Military | UTC - 12 hours |
| Z | Zulu Time Zone | Military | UTC |

FIG. 3-C

METHOD AND SYSTEM FOR IDENTIFYING USERS AND DETECTING FRAUD BY USE OF THE INTERNET

CROSS-REFERENCE

This application is a continuation-in-part application of U.S. patent application Ser. No. 11/241,739 filed on Sep. 29, 2005, which is a continuation-in-part application of U.S. patent application Ser. No. 10/791,439 filed on Mar. 2, 2004, and claims the benefit of priority to U.S. Provisional Patent Application Ser. No. 60/694,768 filed Jun. 27, 2005, all of which are incorporated herein by reference in their entirety.

BACKGROUND OF THE INVENTION

The invention relates to Internet purchasing or e-tail transactions and specifically to detecting fraud in such transactions when ordering products, services, or downloading information over the Internet.

There is a continuing need to develop techniques, devices, and programs to detect and prevent Internet fraud. The invention provides a method and a system for detecting and preventing Internet fraud by utilizing and analyzing a number of parameters to uniquely identify a customer and a potential fraudulent Internet-based transaction.

DESCRIPTION OF THE PRIOR ART

Many methods and systems have been developed over the years to prevent or detect Internet fraud. Today, to gain consumer confidence and prevent revenue loss, a website operator or merchant desires an accurate and trustworthy way of detecting possible Internet fraud. Merely asking for the user name, address, phone number, and e-mail address will not suffice to detect and determine a probable fraudulent transaction because such information can be altered, manipulated, fraudulently obtained, or simply false.

Typically, an Internet user who accesses a website for obtaining a service, product, or information, not only enters personal information as mentioned above, but is also requested to provide a credit card account number, expiration date, and billing address. An online criminal seeking to obtain goods, services, or access to information (text and/or visuals over the Internet) commonly uses someone else's credit card information to obtain the services or products during the transaction. To prevent such occurrences, websites, via credit card companies and banks, often check to see if the address on the order corresponds or matches the address for the credit card owner. Although billing and shipping addresses can differ, such as when someone purchases a gift for another, it is a factor to consider in the verification process. Additionally, merchants utilize phone number matching between that of the Internet order and the credit card company database. Another commonly used technique for order verification is e-mail address verification where the website operator sends a message to the user e-mail address asking the customer to confirm the order prior to executing the same. Yet, online thieves frequently use e mail addresses from large portal sites that offer free e-mail accounts. These e-mail addresses are easily disposable and make it harder for the website operator to identify the fraudulent customer before executing the transaction.

More sophisticated websites now capture a variety of parameters from the user known as Common Gateway Interface parameters (CGI parameters). These parameters commonly include non-personal information such as a user Internet Protocol Address (IP Address). Every computer connected to the Internet is assigned a unique number known as its Internet Protocol (IP) Address. Much like a phone number in a home or office, an IP address can be used to identify the specific user or at least the particular computer used for an Internet transaction. In addition, since these numbers are usually assigned in country-based blocks, an IP address can often be used to identify the country from which a computer is connected to the Internet. Yet, IP addresses can change regularly if a user connects to the Internet via a dial-up connection or reboots their computer. Online thieves also have ways of scrambling their IP addresses or adopting another IP address to make it nearly impossible for the website operator to identify the true user. Thus, websites typically use an IP address plus a further non-personal identifier such as a Browser ID (or user agent), a cookie, and/or a registration ID to try to identify a unique user and to prevent fraud in a second transaction.

A Browser ID provides the website operator with a wealth of information about the user such as the software being used to browse or surf the Internet. Additionally, the Browser ID includes information about the user computer operating system, its current version, its Internet browser and the language. Thus, the Browser ID has valuable information for identifying a unique user. The Browser ID may also have more detailed information such as the type of content the user can receive; for example, this lets the website operator know if the user can run applications in FLASH-animation, open a PDF-file, or access a Microsoft Excel document. Yet, Browser IDs from different computers can be similar, as there are so many Internet users and thus many have similar computers with the same capabilities, programs, web browsers, operating systems, and other information. A cookie refers to a piece of information sent from the web server to the user web browser which is saved on the resident browser software. Cookies might contain specific information such as login or registration information, online 'shopping cart' information, user preferences, etc. But cookies can easily be deleted by the computer user, by the browser, or turned off completely so that the server cannot save information on the browser software. Thus, cookies alone cannot serve as a unique identifier to thwart an Internet thief.

Accordingly, what is needed is a method and system that overcomes the problems associated with a typical verification and fraud prevention system for Internet transactions particularly in the purchasing of services, products, or information by uniquely identifying each consumer. Then, when that consumer seeks a second fraudulent purchase, the website operator will detect the same and block the order or, at least, obtain more information to ensure the order is legitimate. The system should be easily implemented within the existing environment and should be adaptable and compatible with existing technology.

SUMMARY OF THE INVENTION

In accordance with the invention, a method and system is provided for detecting potentially fraudulent transactions over the Internet. The method and system comprises obtaining information relating to the transaction from the consumer and combining this information with a unit corresponding to the change of time, a delta of time parameter, to create a unique computer identifier. If a future transaction involves an identical computer identifier, as described below, which was previously engaged in a fraudulent transaction, the website operator can choose to cancel the transaction, pursue legal action, seek further verification, or the like. By using information relating to the first transaction, such as the IP address and/or Browser ID, and combining it with the delta of time parameter, as detailed herein, the website host can more accurately preventively track fraudulent users online by comparing computer identifiers to each other. In so doing, an integrated fraud prevention system is provided which allows the website host, merchant, or the like, to accurately and efficiently determine the validity or fraudulent quality of a transaction sought to be transacted over the Internet.

Accordingly, the invention provides a method and system for improving fraud detection in connection with Internet transactions. Various embodiments of the invention utilize existing technological capabilities to prevent online thieves from making second fraudulent transactions.

Another aspect of the invention provides methods and systems for detecting and preventing Internet fraud committed as a result of "scams" or deceptive practices developed to acquire personal, confidential and/or financial information. The concepts of the invention described above may be characterized as "fingerprinting" techniques and methods to identify and/or prevent fraud involving information obtained through Internet scams. These unlawful practices will likely continue as new techniques are developed in addition to schemes already known to those in field today such as phishing, pharming, spoofing, session cloning and other deceptive practices. It shall be understood that the clock based or delta of time parameters provided herein can be used within the scope of the invention either alone or together with other known or future developed fraud parameters in the fight against online fraud and Internet scams. The various methods and systems provided in accordance with the invention offer improved and enhanced fraud detection and/or prevention solutions for e-commerce and Internet based transactions. These solutions provide a degree of invisibility to users and fraudsters alike and do not require any or all of the following: user interaction (less likelihood for mistakes or carelessness), opt-in (no adoption issues and full coverage of anti-fraud measures can be provided), change in customer behavior (no confusion as to what actions need be taken or avoided), downloads or cookies (no compatibility issues with user computers or browsers). Moreover, these Internet based solutions generate low false-positives and false negatives so as to minimize loss of business for mistakenly turning down legitimate transactions and successfully rejecting transactions that are fraudulent. The invention can incorporate a type of link analysis on user information from compromised accounts to identify a fraudster and/or the computer used to conduct fraudulent transactions online.

The features and advantages to various aspects of the invention are readily apparent from the following detailed description of the best mode for carrying out the invention when taken in connection with the accompanying chart and other portions of the specification and figures herein.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 1 is a chart that illustrates the versatility and accuracy of the invention in weeding out possible fraudulent online transactions.

FIG. 3 A-C is an index of different Time Zones around the world.

DETAILED DESCRIPTION OF THE INVENTION

The present invention relates to a method and system for detecting potentially fraudulent transactions over the Internet. Various modifications to the preferred embodiment will be readily apparent to those skilled in the art and the general principles herein may be applied to other embodiments. The present invention is not intended to be limited to the embodiment shown but is to be accorded the widest scope consistent with the principles and features described herein. It is to be understood that the website, its host, or operator does not have to be a merchant of goods.

The present invention provides a fraud prevention system for online transactions by uniquely identifying a customer based on a number of parameters at least one of which is a delta of time parameter and another of which is another Internet related parameter, preferably the Browser ID of a computer.

Referring to the chart shown in FIG. 1, what is shown is a series of typical transactions on the Internet between a merchant and several customers. Each customer establishes a connection between his computer and the merchant's website. Upon making this connection, the merchant's website receives some non-personal identification information from the customer. This non-personal information typically includes Common Gateway Interface (CGI) parameters such as the customer's Internet Protocol (IP) Address and the computer's Browser ID. While "hackers" can change, disguise, and/or emulate the IP address to mask a fraudulent transaction, most do not now have the capability nor the idea to do the same for the Browser ID. While some "hackers" can change the Browser ID, it is not a trivial tool and if one needs to change it all the time it is not allowing those thieves to easily steal, hence, they are likely to go to a site that does not check Browser IDs. In a typical embodiment, when the customer decides to purchase services, goods, or information from the website, the customer must input additional and more personal information. This personal identification information may commonly include the customer's name, address, billing and shipping information, phone number, and/or e-mail address. A key feature of the present invention is that the website server also captures the local time of the customer's computer, typically through a program such as Javascript, as well as the local time of the server's computer. The server then calculates the time difference (or delta of time) between the customer's computer clock and the server's computer clock. This can be recorded in any desired format such as hours, minutes, seconds, or the like, but corresponds to a delta of time parameter. The delta of time parameter, the non-personal information, including but not limited to the preferred usage of the Browser ID, and/or the personal information are stored by the merchant and used to uniquely identify the customer.

Figure 2:
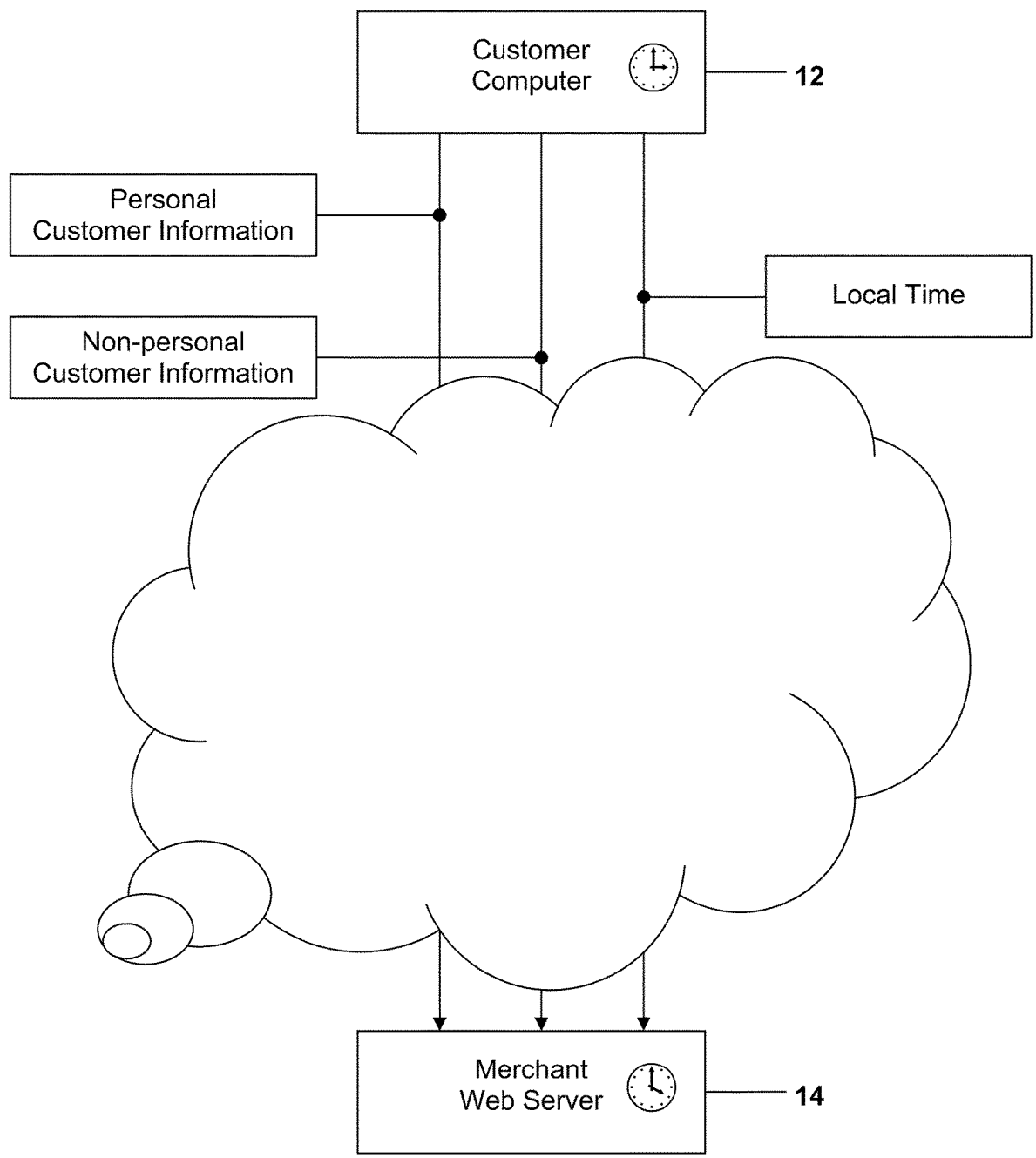
FIG. 2 describes a connection between a customer computer and a merchant website server whereby each device maintains respective times according to a resident clock.

As shown in FIG. 2, a connection may be established between a customer computer 12 and a merchant website server 14. Upon making the online connection, various information is transmitted by the customer computer 12 that may operate as a unique user and/or computer identifier. This information may include personal information specific to the customer, non-personal information corresponding to the customer computer, and the local time according to the customer computer. The merchant website can receive non-personal customer information including CGI parameters such as the customers IP address and computer Browser ID. The customer can further input personal information when making a purchase from the website including a customer name, address, billing and shipping information, phone number, and/or e-mail address(es). In accordance with this embodiment of the invention, the relative customer computer local time according to its resident clock may be captured, typically through a program such as Javascript or any other time indicator employed by telecommunications and networking systems such as timestamps within transmitted data packets (e.g., TCP timestamps in packets within a data stream wherein each packet includes a header portion containing a 32-bit timestamp generated by a originating computer according to local resident time). The local time of a customer computer or client may be captured during any selected moment of action such as when the customer visits or is logging into a merchant site, at the time of a purchase or at times during an exchange of information that can be reflected in timestamp to data packets transmitted across a selected network or the Internet. At the same time, the merchant web server also maintains and measures a relative website server local time according to a resident clock. The time difference or delta of time as between the customer computer clock and the servers computer clock can be therefore calculated. This approach in determining when to measure a time of action or event may be characterized as opportunistic in that measurements are taken at selected moments in time. The delta of time can be measured, calculated and recorded by the merchant web server or any other computer operating with or connected to the merchant online system. The delta of time may be measured in any desired format or increments of time such as hours, minutes, seconds, milliseconds (microseconds) or the like. Over different periods of time, the delta of time parameters are generally persistent with relatively high degree of accuracy. Accordingly, the measured time difference between these computer clocks provides a fraud parameter in accordance with this aspect of the invention that may link or associate a particular customer computer with transactions that may involve fraud.

The delta of time (Time Diff) parameter provided in accordance with this aspect of the invention may function alone or combined with other parameters to provide what may be characterized as a "PC fingerprint." Such devices include personal computers or any other type of computing devices or computers including those from Apple Computer, Inc. (hereinafter collectively PC). Each PC connected to the Internet may be configured slightly different and may possess identifiable characteristics distinguishing it from other devices which can be exploited by the invention. A more accurate PC fingerprint may be generally developed by considering a greater number of available computer related parameters. The Time Diff parameter may serve as part of a PC fingerprint for identifying a device which serves as a distinctive mark or characteristic about a particular user device. In addition to a Time Diff parameter, the flow of information exchanged during an Internet session may be captured and provide significant information about the user device on the other end. This type of information exchange considered by the invention is preferably invisible and transparent to users, and does not rely on user action or modification of online behavior. The Time Diff parameter may thus link incidents involving fraud, hacking, phishing etc. by automatically correlating information such as login data, computer data and customer data. For example, by analyzing data sent from the user device, information about the device and browser used by an individual may be obtained such as a Browser ID, the Browser/device IP address and the particular Browser language. By formulating a more accurate PC fingerprint, there is less likelihood of mistakenly associating a user with a fraudulent transaction (false positive) during e-commerce transactions, or failing to detect a fraudster. Other applications of the invention include national security and law enforcement whereby a computer can be uniquely identified in a manner similar to way thieves can be identified by a physical fingerprint. Accordingly, a PC fingerprint provided by the invention enables the ability to link and connect different online accounts and activity to a same device.

The Time Diff parameter provided in accordance with the invention may be captured or measured during various selected moments of action during an Internet session such as the login step or procedure. Today it is estimated that medium to large e-commerce merchants and financial institutions receive over 5,000 orders per day for digital and shipped goods, and over 100,000 logins per day. Many Internet Service Providers (ISPs) also manage accounts and user logins on an enormous scale also. This aspect of the invention can be applied to broader applications online to authenticate a user or uniquely identify a computer on the Internet in addition to e-commerce transactions and fighting fraud or identify theft. For example, the invention may be applied where a merchant or financial institution (FI) server resides in California, USA and a valid customer (Customer) who also normally resides in California, USA. It shall be understood that the following examples below describe login procedures which could be modified according to the invention for any other selected moment of action during an Internet session such as logout procedures, when a user clicks a "submit" button within a user interface, or transmission of any other information between users online.

During a "valid" login procedure, the Customer may initiate a login procedure from a web browser on a computer that registers a time according to its clock as follows: Time=11:00 am/Time Zone: GMT−8 and an IP address from the California region. Meanwhile, from the perspective of the FI, the recorded time at the FI server according to its respective clock may be: Time=11:01 am/Time Zone: GMT−8 and an IP address from the California region. It shall be understood that the invention may incorporate IP address locator tools which determine an identifier for an online device and its location based on geographic regions within a country or around the world. Upon analysis of this information from the Customer that may be reflected on a conceptual or actual Score Card, which can be calculated and stored in memory within the server of the FI or any its other network computers, the FI can determine whether there is a match indicating a valid user login. Accordingly, the exchange of information in the above described example may be reflected as a match on or as a Score Card that measures the validity of the customer: Time Diff=Match/Time Zone=Match/IP=Match.

During a "suspect" login procedure, a Customer may initiate a login procedure from a web browser on a computer that registers a time according to its clock as follows: Time=10:02 pm/Time Zone: GMT+3 and an IP address from a region in Russia. Meanwhile, from the perspective of an FI, the recorded time at the FI server according to its respective clock may be: Time=11:01 am/Time Zone: GMT−8 and an IP address again from its California region. Upon analysis of this information from the Customer in accordance with the invention, the Time Diff and Time Zone measurements as between the Customer and the FI are different from prior valid logins and therefore not a match. Furthermore, the IP address received by the FI indicating a device outside of the California region would not be a match and further suggest an invalid login attempt by a fraudster or other unauthorized individual. The Score Card for this login example measuring the validity of the customer can thus show: Time Diff=No Match/Time Zone=No Match/IP=No Match. The FI would be thus alerted that the alleged Customer attempting to login was likely invalid.

During a "valid" login procedure from a Customer traveling with a computer and browser in London, the Customer may initiate a login procedure at a registered time according to its clock as follows: Time=11:00 pm/Time Zone: GMT−8 and an IP address from a region around London. Meanwhile, from the perspective of an FI, the recorded time at the FI server according to its respective clock may be: Time=11:01 am/Time Zone: GMT−8 and an IP address again from its California region. Upon analysis of this information from the Customer, the Time Diff and Time Zone measurements as between the Customer and the FI are the same as prior valid logins and therefore a match. While the IP address received by the FI indicating a device outside of the California region would not be a match and suggest an invalid login attempt, the comparison of the Time Diff and the Time Zone measurements would be a match. Because the Time Diff parameter provided in accordance with the invention can be used in combination with other fraud parameters for authentication and identification, a Score Card for this login example measuring the validity of the customer could still show a match nevertheless: Time Diff=Match/Time Zone=Match/IP=No Match.

The Time Diff parameter provides fraud detection tools for online merchants, financial institutions and other parties conducting commerce on the Web. These tools can be applied to combat well recognized problems such as reducing the number of false positives which reduce possible revenue from mistakenly identified valid users. In addition, Time Diff based tools provide an effective solution to identifying and preventing fraud during the course of international and overseas transactions where there are significantly increased risks of fraudulent activity. Accordingly, the Time Diff parameters herein allow the creation of a more accurate and relevant geo-location or PC fingerprint for many different types of online transactions around the world.

It shall be understood that the Time Diff parameters provided in accordance in this aspect of the invention may be defined as the difference in the registered computer times as measured in any unit of time (e.g., hours, minutes, seconds, milliseconds, microseconds) between any selected computers either alone, or in combination with the Time Zone herein or any other temporal characteristics. Furthermore, as with other embodiments described herein, the concepts of the invention can be preferably applied to e-commerce transactions to deter or identify fraud but is not limited thereto and are equally applicable to any other online application to uniquely identify and link a computer device on the Internet according to a Time Diff parameter. While consideration of Time Diff parameters alone may not be completely effective as with any solution against fraud, phishing etc., the PC fingerprinting methods and techniques provided herein enables effective link analysis between computer devices and compromised accounts or any other transaction having or associated with a fraudulent past or history. By following and learning from historical incidents of security breaches and fraud, the invention can quickly pinpoint repeat offenders and build a stronger defense against different criminal behavior or schemes now known and those that will be developed in the future.

Another embodiment of the invention provides a delta of time (Delta Time) parameter that can be calculated based on the local time as indicated through the browser of a client computer (Browser Time) and the local time as determined at a server (Server Time)—also applicable in FIG. 2. The Delta Time may operate as a fingerprint for a particular client computer or computer and assists in uniquely identifying it from other computers on the Internet or selected network. Each local time for any client or server connected to the Internet or other network system can be measured according to the clock for that particular device. The measured Delta Time parameter for any selected moment of action in accordance with the invention may be perceived as having two temporal components: an actual time and a time zone. For example, the measured local time at a client site may include a Browser Time of Feb. 1, 2005 14:00:00 PM, and a Browser Time Zone of GMT−8. The measured local time at a server site may include a Server Time of Feb. 1, 2005 17:01:13 PM, and a Server Time Zone of GMT−5. The Delta Time as between the Browser Time and the Server Time, and the Browser Time Zone in comparison to the Server Time Zone, can be therefore calculated in accordance with the invention.

A preferable embodiment of the invention provides a Delta Time or time differential which takes into consideration daylight saving time (DST) in selected time zones and countries around the world such as those identified in FIG. 3. In addition to collecting respective local times and time zones from clients or customer computers and website servers at a current selected date or moment of action, a website server or any other network computer can also capture information relating to particular time and time zones for selected (future or even past) dates. A selected Delta Time during DST (DST Delta Time) can be determined for a particular customer or client computer when the registered time for such other date is different than the current selected date. For example, the Delta Time value for such other date(s) can be +/− one hour ahead or behind. For time zones that do not observe DST, the Delta Time value will remain unchanged during such dates when DST would be normally observed. By calculating and identifying values for Delta Time and relevant Time Zones for multiple dates ahead of time in accordance with the invention, accurate delta of time values can be provided to assist in uniquely identifying or fingerprinting a client or customer computer throughout the year regardless of whether DST is observed in the relevant country or region of the world. Because only certain countries and regions of the world observe DST while others do not, it may be possible to pinpoint in which location the device resides based at least in part on the geo-location fingerprints provided by the invention.

DST (also called Summer Time) is the portion of the year in which the local time of a region is usually advanced by one hour from its official standard time. This system was originally intended to "save" daylight, as opposed to "wasting" time (for example, by sleeping past sunrise). The official time is adjusted forward during the spring and summer months, so that the active hours of daily life involving events such as work and school will better match the hours of daylight in theory. Today approximately 70 countries utilize DST in at least a portion therein—the only major industrialized country not to have introduced daylight saving is currently Japan. DST begins for most of the United States of America at 2 a.m. on the first Sunday of April and clocks are turned (spring) forward one hour. Time reverts to standard time at 2 a.m. on the last Sunday of October and clocks are turned (fall) back one hour. Each time zone switches to and from DST at a different time. Furthermore, legislation may be passed by Congress and other state governmental bodies from time to time on whether to observe, shorten or lengthen DST. DST for the United States of America and its territories is not observed in Hawaii, American Samoa, Guam, Puerto Rico, the Virgin Islands, most of the Eastern Time Zone portion of the State of Indiana, and the state of Arizona (except the Navajo Indian Reservation which does observe DST). Meanwhile, for all countries in the European Union except Iceland, Summer Time begins and ends at 1 am Coordinated Universal Time, UTC (Greenwich Mean Time, GMT) which generally starts on the last Sunday in March, and ends the last Sunday in October. All time zones change at the same moment in the EU. It shall be understood that observance of DST is controversial and ever changing so the delta of time parameter provided in accordance with this embodiment of the invention can be flexibly adapted to devices all over the world when it changes and whether or not DST is observed in certain countries or states within particular time zones.

In this embodiment of the invention, various time zones as shown in FIG. 3 can be predetermined such that it is known ahead of time whether or not DST is applicable for that region. For example, a Delta Time parameter may be calculated for a client computer at some future date(s) during DST. When the clock of a client computer registers a time of 8:00 pm PST (Greenwich Mean Time GMT−8) on a selected date during the fall season, its respective delta of time is changed one hour ahead to 9:00 pm PST (GMT−8) on a selected date in the spring season to account for DST when applicable. By collecting and determining times at one or more selected dates in the future, it is possible to determine whether a device will or will not go into DST from the beginning rather than waiting until later to see whether the registered time is the same or different. This will also assist in identifying the country or region for a selected user device. Accordingly, seemingly unrelated transactions can be linked at least in part from a distinctive timestamp delta of time (Delta Time) that can be measured from the internal clock or data (TCP, NTP, RTP etc. timestamps within data packets) sent from the device. It should be understood that the Delta Time parameter can be calculated according to any selected units of time as with other embodiments of the invention herein such as minutes, seconds, or milliseconds.

Figure 4:
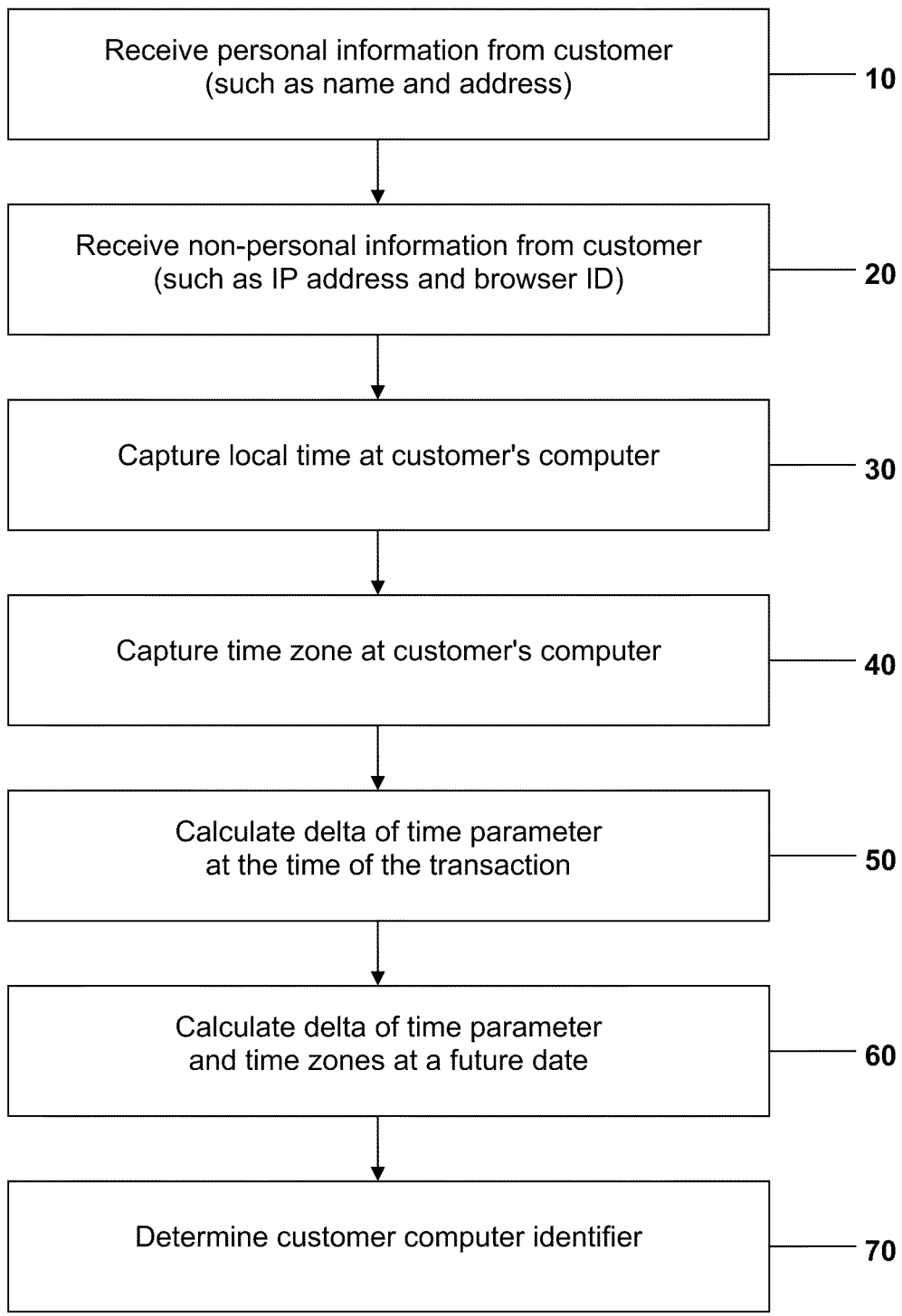
FIG. 4 is a flowchart describing an embodiment of the invention that provides a customer computer identifier.

FIG. 4 is flow chart depicting another aspect of the invention that provides methods for determining a customer computer identifier (CI) used in detecting fraud in connection with online commercial transactions. At step 10, a merchant web server receives customer personal information, such as name, address, phone number, etc. At step 20, the web server receives non-personal information from the customer such as IP address and Browser ID. At steps 30 and 40, the web server captures the local time and the time zone at the customer computer. The delta of time parameter is then calculated at the time of the transaction at step 50. It should be noted that the delta of time parameter may be calculated at the time of the customer login, other times during a transaction or at any selected moment of action. At step 60, the delta of time parameter and time zones are calculated at one or more future selected dates. Using the customer information and the delta of time parameters, the customer computer identifier is determined at step 70. Any one or more of these steps may be used in combination with each other and in a different order of operation depending on selected applications. It should be further understood that processes in accordance with this embodiment of the invention may provide a delta of time parameter and a computer identifier described elsewhere herein and also used together with other aspects of the invention, e.g. FIG. 2.

Figure 5:
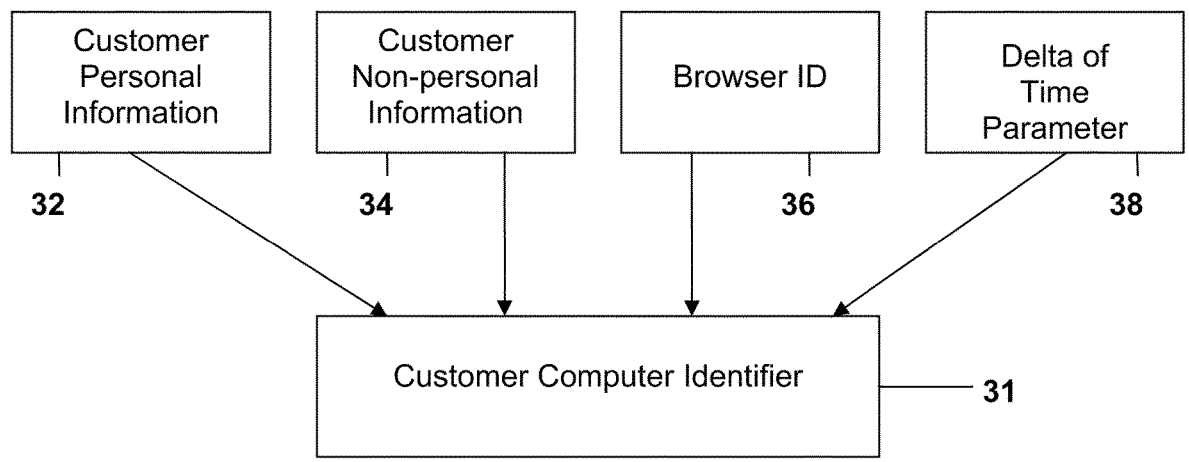
FIG. 5 describes components of a customer computer identifier provided in accordance with the invention.

In another preferable embodiment of the invention, as illustrated in FIG. 5, a particular subset of selected parameters or fields can combined or aggregated to construct a customer computer identifier 31. For example, the customer computer identifier 31 can be determined based on selected customer personal information 32, customer non-personal information 34, including a Browser ID 36 and a delta of time parameter 38. These selected parameters are not meant to be limiting and other information or fraud parameters described herein or otherwise known to those of ordinary skill may be used to create a customer computer identifier 31. Specifically, another preferable embodiment of the invention includes a customer computer identifier consisting of a delta of time parameter plus a Browser ID alone which can be used to identify or "fingerprint" a user computer. But the selected customer information 32 alone is not entirely reliable by itself as it can not be easily validated as suggested above. Nevertheless when combined with non-personal information 34, and in particular a measured delta of time parameter, other embodiments of the invention may provide reliable and effective methods of identifying computers on the Internet such as those associated with known fraudulent transactions. The delta of time parameters provided in accordance with this and other aspects of the invention herein offer fingerprinting capabilities that uniquely identify particular computing devices used in e-commerce transactions. Because computer users rarely personally change the internal clocks within their computers, the delta of time parameter will likely be the same (or within a range or within predictable limits) for a computer every time that computer is used to conduct an online transaction with the same merchant even if the user disguises or changes the IP address. The Browser ID is also not likely to be changed, even by a consumer seeking to perpetuate a fraudulent transaction. Thus, the delta of time parameter (the difference between the time of day of the computer user's clock and the time of day on the website's server clock as in FIG. 2) is an important component of the computer identifier because it, along with the preferred Browser ID or other personal or non-personal information, is a good indication of the identity of a subsequent user on the same computer. The delta of time parameter also allows the merchant to potentially locate the computer in terms of a time zone, region, or country.

Accordingly, once a merchant determines that a first fraudulent transaction may have been made, the merchant can flag the customer computer identifier, i.e. Browser ID and delta of time. In a preferred embodiment, the computer identifier will include at least its delta of time and Browser ID, but may also include other personal and/or non-personal information. Then, the matching parameter can be used to identify a subsequent transaction which reveals a user with an identical set of computer identifiers. The matching is typically implemented by software, for example, on a hard disk, floppy disk, or other computer-readable medium.

Figure 6:
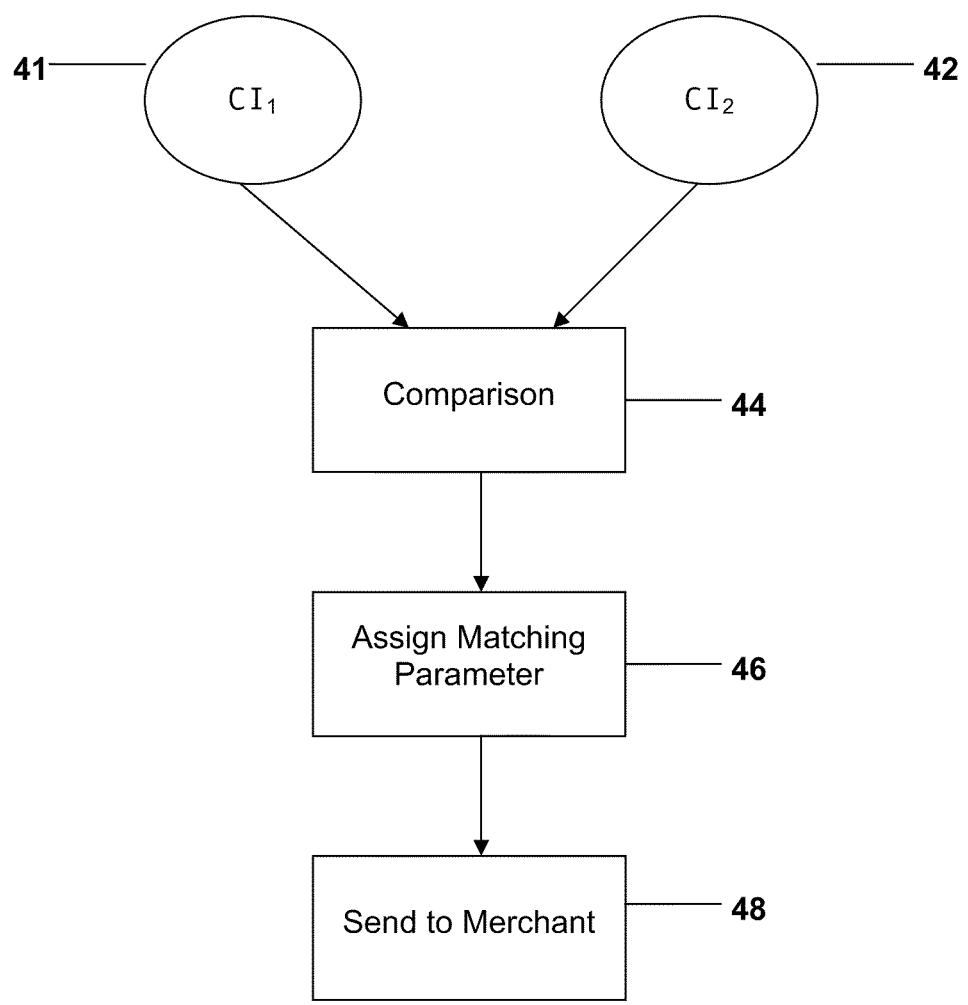
FIG. 6 illustrates a comparison of computer identifiers that provides a matching parameter for consideration by an online merchant.

A flowchart is provided in FIG. 6 that illustrates methods to detect fraud according yet another embodiment of the invention. Once a merchant web server determines the computer identifier (CI) for a first transaction, $CI_1$ 41 and a subsequent transaction, $CI_2$ 42, a comparison can be made as between the two identifiers 41 and 42 and performed at step 44 as illustrated. After the comparison has been made, a computer implemented software program may continue to execute the next step of assigning a matching parameter value to the pair of transactions based on the similarities between the first and subsequent transactions, at step 46. At step 48, the website server running the program to compare computer identifiers may inform the merchant of the matching parameter value, which in turn may provide information suggesting to cancel or confirm the transaction, inform the customer status order, demand more information, or the like. The merchant may then choose its desired course of action. It shall be understood that the memory of a merchant web server may contain software programs with instructions to perform any combination of these steps to provide these and any other methods described herein in accordance with the invention.

Figure 7:
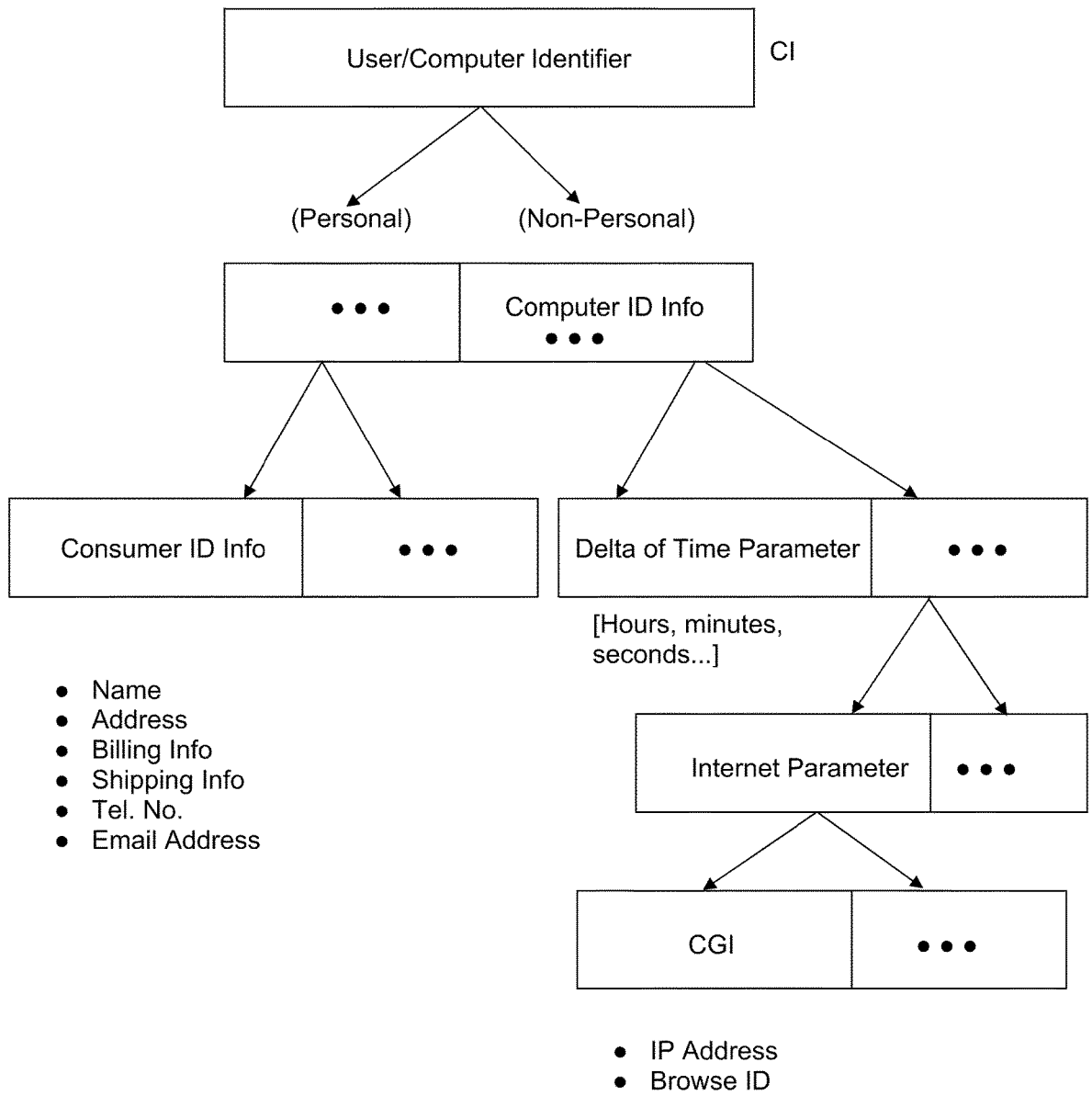
FIG. 7 shows various components and parameters that may comprise a user computer identifier in accordance with an embodiment of the invention.

FIG. 7 provides a hierarchical representation of user computer identifiers (CIs) for the identification and prevention of online fraud that may be generated as described with the various embodiments of the invention. A computer identifier (CI), which may uniquely identify a computer associated or linked to known fraudulent transactions (or for alternative purpose described herein), may comprise both personal and non-personal parameters. Personal parameters may include consumer identification (ID) information and other selected personal parameters. Examples of selected consumer ID information include but are not limited to the following: user or personal name, address, billing information, shipping information, telephone number(s), e-mail address(es). Meanwhile, non-personal parameters may include a variety of known fraud parameters including computer identification (ID) information. This includes delta of time parameters as described herein which may be measured in any increment of time such as hours, minutes, seconds and milliseconds. Other computer ID information includes Internet Parameters such as Common Gateway Interface (CGI) parameters including a customer computer Internet Protocol (IP) Address and Browser ID.

A particularly important feature of the present invention is the merchant's ability to include, remove, and weigh each parameter within the computer identifier. For example, the merchant may choose to only use the delta of time parameter and Browser ID to form the unique computer identifier. Accordingly, the merchant may set the matching parameter to fit a level of comparison between the first and subsequent transaction. For example, since deltas of time may slightly change because of the differences in accuracy between the server and the user computer clock mechanism, computer clocks and deltas may slightly vary over time. The merchant may set the matching parameter to include a range of delta of time, such as a few minutes, instead of an exact match. This way, even if the user computer "loses time," the matching parameter will still identify the subsequent transaction as a potential fraudulent one based on other information within the computer identifier.

Figure 8:
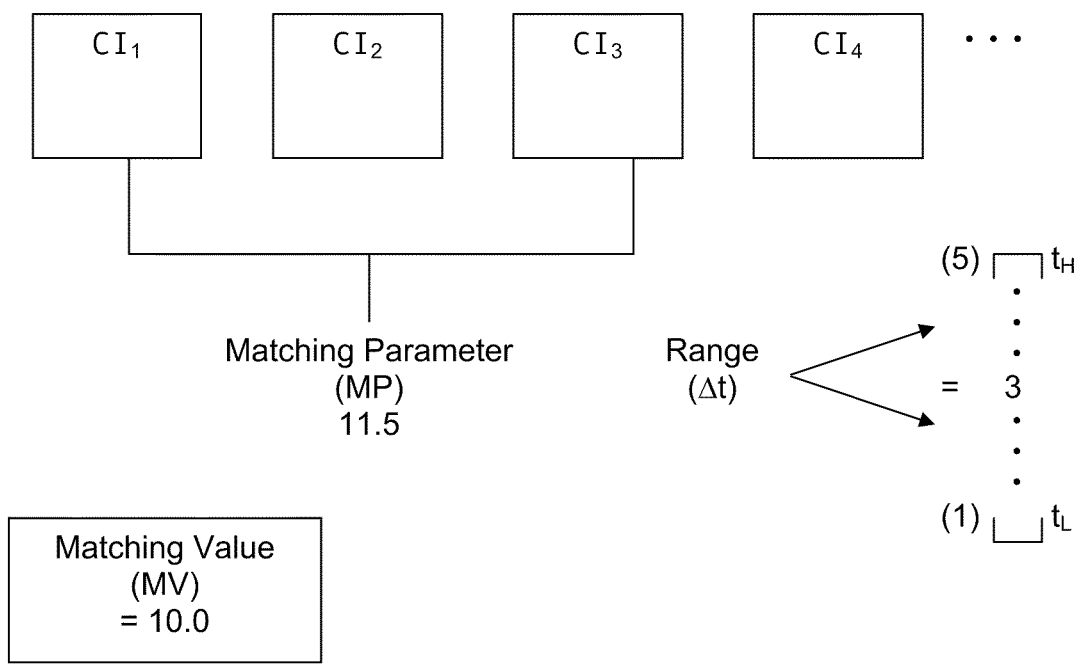
FIG. 8 depicts the comparison between multiple computer identifiers to provide a matching parameter that can be compared against a preselected matching value.

A series of computer identifiers (CIs) are shown in FIG. 8 which can be matched, e.g., $CI_1$-$CI_4$ . . . . When a CI is generated by a method or software program by a computer to be identified or associated with a known fraudulent transaction, it can be compared to another selected CI. During a comparison step between the two, a matching parameter (MP) may be calculated. The calculated value of the MP may consist of a raw number or score that is dimensionless, e.g., 11.5, or some increment of measurement including time, e.g., hours, minutes, seconds, milliseconds. The matching parameter may be thus compared in a next step to a preselected reference or baseline Matching Value (MV), e.g., 10.0. A merchant or anyone trying to identify the computer can variably set the MV relative to anticipated or measured MP values. Because of slight differences in computer clocks, network latency, variable Web traffic and bandwidth constraints, the delta of time parameters provided herein may vary from time to time even for the same selected computer. A preselected range (delta t) may be therefore defined in accordance with this aspect of the invention that allows for a certain tolerance setting or range (Range) of MP values relative to the MV. For example, an lower limit within the Range may allow for a [+/−1] variance of the MP value relative to the MV, or a higher limit within the Range may allow for a [+/−5] variance. When the MP value falls within the defined Range relative to the MV, this can indicate a positive match or identification (ID) of a device for various purposes as described herein such as linking a computer to known online fraudulent transactions. When the MP value falls outside of the defined Range relative to the MV, this can indicate a negative match or identification (ID) of a device. It shall be understood that these MP values may be alternatively defined as a Score Card value and incorporated with other corresponding aspects of the invention described elsewhere herein to detect and prevent online fraud. The matching parameters, values and ranges described in accordance with this variation of the invention can be modified and defined in a variety of ways and are not limited to those specifically provided for illustrative purposes. The preceding steps may be carried out as methods provided herein, or alternatively as a series of software program instructions and code.

Furthermore, in accordance with another concept of the invention, the delta of time parameter may be measured as between different times resulting from inherent limitations or flaws of the computer clock(s) in a single device as opposed to multiple devices. In this embodiment of the invention, a device fingerprint or PC fingerprint is created to uniquely identify and link a computer to known fraudulent transactions or behavior by measuring and tracking an inherent inaccuracy or flaw of a resident clock. In comparison to other embodiments of the invention, which may be described as an "external" delta of time as between two different devices (host server/user client), another variation provided herein provides a device identifier using what may be considered an "internal" delta of time as between a single device itself (standalone). Over a period of time, computers clocks as with other ordinary clocks are not perfect and tend to run fast or slow eventually. The rate at which time is gained or lost for a computer clock may be defined as "clock skew" and can be measured in microseconds per second (clock skew may be also defined as the instantaneous difference between readings of any two clocks or the time what a computer thinks it is as compared to another clock). If the clock has a non-zero skew, not only is the end-to-end delay measurement off by an amount equal to what can be defined as clock offset, it also gradually increases or decreases over time depending on whether it is running relatively faster or slower. Even when there is a constant clock skew, the clock offset values increases or decreases over time depending on the sign (+/−) of the skew. So any given computer or device described herein can have a single or multiple clocks (e.g., systems clock, TCP timestamps options clock) that are unable to remain consistent and accurately track time. But the clock skew of a particular device may be different from other (even seemingly identical) computers, and thus serve as a PC fingerprint linking it to certain transactions and fraud. It is generally well known that different computer systems have different and relatively constant clock skews. This imperfection or flaw in the device can thus exploited in a way to identify a particular device or computer in relation to certain transactions and behavior since it is relatively persistent and unique in accordance with the invention. The internal delta of time provided in accordance with this embodiment can be therefore applied in the same manner as any other external delta of time described elsewhere herein to provide a PC fingerprint linked to transactions carried out on devices involving e-tail or e-commerce fraud, breaches in security and various types of criminal online behavior.

In this embodiment of the invention, the delta of parameter can be measured in units of microseconds per second (ms/s, first derivative or rate at which time is gained or lost) while in other embodiments of the invention the parameter can be measured in microseconds. This delta of time parameter can therefore be defined as a time difference measured between a first clock measurement and a second clock measurement over a selected period of time or time interval. For example, the TCP timestamp of a first packet of data from a computer may indicate a time t1 (9:01 am) while a second packet may be sent at time t2 (9:02 am). The first and second packets may arrive at a server at times t3 (9:04 am) and t4 (9:07 am), respectively. The clock skew of the computer can be thus calculated as the rate at which time is lost in this instance: t3−t1=3 mins; t4−t2=5 mins (may assume time differences are not attributed to network delays, latency etc. beyond clock skew). The internal delta of time parameter or clock skew in the context of this embodiment of the invention herein may be calculated as follows: 5 mins−3 mins=2 mins divided by 3 mins (which is the selected period of time between first and second packets). In other words, during the 3 mins of time between sending the first and second data packets, the computer clock lost or ran slow 2 mins (0.666 min/min). While clock skew in general is instead measured on the order of microseconds rather than minutes, this example illustrates how these and other embodiments of the invention are not limited to certain ranges. Other units of measurements are applicable to the delta of time parameters as mentioned elsewhere herein. It shall be understood that both internal and external deltas of time can be applied individually or in combination by themselves, or in addition to other parameters as described herein to provide a distinctive PC fingerprint.

The delta of time parameter can be used in or incorporated into a consortium. See, e.g., U.S. Patent Publication No. 2010/0004965, Inventor: On Eisen, filed Jul. 1, 2009, which is hereby incorporated by reference in its entirety.

Another aspect of the invention provided herein extends to detecting and preventing fraudulent transaction based on information obtained through "scams" or deceptive practices developed to gain personal, confidential and/or financial information. For example, a common technique today known as "phishing" involves gaining personal information from an individual to commit identify theft by typically using fraudulent e-mail messages that appear to come from legitimate businesses. "Phishing" can be defined as the act of sending an e-mail to a user falsely claiming to be an established legitimate enterprise in an attempt to scam the user into surrendering private information that will be used for identity theft. The e-mail often directs the user to visit a Web site where they are asked to provide or update personal information, such as passwords and credit card, social security, and bank account numbers, that the legitimate organization already has. But the Web site to which the user is directed is phony and established to steal the user information during a fake session. For example, a widely recognized Web site, e.g., eBay, can be targeted in a phishing scam whereby users received e-mails supposedly claiming that the user account is about to be suspended unless they clicked-on a provided link and updated the credit card information that the genuine Web site already had. Because it is relatively simple to make a Web site look like a legitimate organizations site by mimicking the HTML code, people can be tricked into thinking they were actually being contacted by the Web site and will subsequently go to the fraudulent site to update or provide their account information. Moreover, by spamming large groups of people (or spIMming them which spam sent over Instant Messaging (IM) applications that can include links to fake sites), the "phisher" could rely on a response from at least some percentage of people who actually had listed credit card numbers with the Web site legitimately. The concept of phishing in general can also referred to as brand spoofing or carding, a variation on the idea whereby bait is set with the hope that some will bite despite most individuals knowing better. By way of these seemingly legitimate e-mails, criminals "go fishing" for information which is in turn later used to gain access to a real account. Such information includes commonly stolen items in identify theft including a personal identification number (PIN), user account name, a credit card number, and an account number. Regardless of how this information is obtained, the fraud detection and prevention systems provided herein incorporate unique fraud parameters such as delta of time and clock differential parameters to "phish"-out fraudsters from legitimate users.

The criminal act that is often committed after information is "phished" can be ultimately referred to as "account takeover." These scams are commonly committed by e-mail to users at least partially because millions can be rapidly and efficiently sent to random or selected individuals, but other techniques can involve transmission of a virus through attachments to e-mails. In particular, some viruses can be created to replace the universal resource locator (URL) of a merchant, financial institution or other party commonly stored in a web browser "Favorites" folder. Instead of being routed to an intended legitimate Web site, the user is sent to a fake or spoofed site where user information is shared unknowingly with a fraudster. Similar in nature to e-mail phishing, another Internet scam referred to as "pharming" seeks to obtain personal or private (usually financial related) information through domain spoofing. Rather than being spammed with malicious and mischievous e-mail requests for you to visit spoof Web sites which appear legitimate, pharming can "poison" a DNS server by infusing into it false information resulting in a user request being redirected elsewhere. A browser however will indicate the correct Web site location, which can make pharming a bit more serious and more difficult to detect. A distinction however is that generally phishing attempts to scam people one at a time with an e-mail while pharming allows the scammers to target large groups of people at one time through domain spoofing.

Meanwhile, "spoofing" basically includes a variety of ways in which hardware and software can be fooled into operating as if there was a legitimate transaction or exchange taking place. "IP spoofing" more particularly involves trickery that makes a message appear as if it came from an authorized IP address, e.g., e-mail spoofing. As a result, access can be gained to computers through IP spoofing when an intruder sends messages to a computer with an IP address indicating that the message is coming from a trusted host. To engage in IP spoofing, a hacker must first use a variety of techniques to find an IP address of a trusted host and then modify the packet headers so that it appears that the packets are coming from that host.

Malicious software (aka malware) can be also involuntarily downloaded to a computer and designed specifically to damage or disrupt a system by means of a virus or a Trojan horse. A "Trojan horse" is a program that masquerades as a benign application and unlike many viruses, they do not replicate themselves but can be just as destructive. One of the most insidious types of Trojan horse is a program that claims to rid your computer of viruses but instead introduces viruses onto a computer. The concepts relating to fraud detection and prevention can be applied also to other traditional methods of stealing personal information also include e-mail or other means that involve a fake premise or story such as seeking help fleeing from a third world country (e.g., Nigerian scam) or conducting some type of customer service call or transaction (e.g., "Hello, I am from your bank . . . ").

The fundamental problem of user authentication is exploited time and time again in order to commit fraudulent transaction online. Both financial institutions and merchants face a shared problem and ultimate challenge in properly authenticating who is really on the opposite end of a transaction. Information such as account user names and passwords are useless and rendered ineffective as reliable credentials in light of phishing and other Internet fraud scams. Authentication can be attempted by obtaining various types of information broadly ranging from any or all of the following: something you have; something you know; and/or something you are (biometrics). These include information obtained from tokens (hard, soft, dynamic), shared secret or things not commonly known such as a mother's maiden, a pet's name or a favorite color. An evolving system of security certificates (encryption with public key infrastructure (PKI), secure sockets layer (SSL)) may be relied upon also to verify and authenticate the validity of a party involved in an Internet transaction. Third party bureaus are also relied upon to provide information that can be used to authenticate an individual such as D&B reports, credit histories from Equifax and other agencies, and also Caller ID to identify the number associated with a person. At the same time, a user may attempt to authenticate a merchant, bank or other party at the other end of an online transaction also. Various tool bars may be employed to allow users to verify a web site, an IP address or some other indication that a user is indeed in contact with a merchant, bank or other desired party in a transaction.

The information and actions by a party attempting to prevent or detect fraud is often met with an equally effective and opposite countermeasure by learned fraudsters. When banks or merchants create user names and passwords, they can be rendered ineffective by numerous scams and ways of obtaining user information such as phishing and key-loggers. "Key-loggers" are a type of surveillance software such as spyware that has the capability to record keystrokes to a log file (usually encrypted) made from instant messages, e-mail and any information (including e-mail addresses and Web site URLs visited) typed using a keyboard which can be later sent to a specified receiver. Key-loggers, as a surveillance tool, are often used by employers to ensure employees use work computers for business purposes only. Unfortunately, key-loggers can also be embedded in spyware allowing your information to be transmitted to an unknown third party.) Similarly, cookies that are often created to contain selected information used for identification can be simply deleted, and IP addresses that are associated with fraud can simply hide behind proxies.

Furthermore, when tokens are frequently used as a security measure to gain access to user information, the entire session or exchange can be merely cloned. The term "session cloning" may be defined as the ability of a third party to duplicate the session ID of a user and use it to interact with the web-based application at the same time as the original user. Session cloning is generally more of a threat when session IDs are predictable or obtainable, or if the site allows IP hopping. IP hopping is permitting the user to change their IP address mid-session without having to re-authenticate to the web site. To minimize fraud and prevent IP hopping, one alternative is to track the domain of the source address (remembering domains can have more than two components) and require re-authentication if the domain changes. This does not prevent IP hopping within the same ISP but does limit the exposure. Another option to minimize risk is to consider using an inactivity timeout or terminating a session after a certain period of inactivity in order to protect people who leave their accounts signed-on and their systems unattended. Regardless of these preventative measures taken against session cloning, the risk of fraud remains which provides an opportunity for the invention herein to detect and prevent such activity when an attempt is made to use information from a computer.

It shall be understood that the description of fraudulent schemes provided herein is not exhaustive and that additional techniques will be developed in the future to improperly gain access to user information. Regardless of the means and methods used to obtain such information, the concepts of the invention can be applied to detect and prevent fraud by uniquely linking or fingerprinting such criminal activity with devices based upon selected delta of time parameters, clock differentials and time based parameters provided elsewhere herein. These solutions can be implemented with no behavioral modification and have a zero imposition on a user as new ways are constantly developed to break past security barriers. The onus is not placed on the consumer to prevent attacks, nor is the consumer asked to change certain behavior to combat phishing or any other criminal behavior or scheme developed in the future.

Although the present invention has been described in accordance with the embodiments shown, one of ordinary skill in the art will recognize that there could be variations to the embodiment and those variations would be within the spirit and scope of the present invention. Therefore, although the present invention was described in terms of a particular fraud prevention method and system, one of ordinary skill in the art readily recognizes, that any number or parameters can be utilized and their use would be within the spirit and scope of the present invention.

What is claimed is:

1. A non-transitory computer storage storing one or more computer-executable instructions that, when executed by one or more processors, cause the one or more processors to perform steps of:

receiving and storing a plurality of matching parameters;
detecting an electronic communication of a first online transaction between a first consumer device and a merchant server via a merchant website;
based on the detecting of the electronic communication of the first online transaction:
receiving an IP address of the first consumer device;
capturing consumer time expression data associated with the first consumer device, wherein the consumer time expression data comprises a time of the first consumer device and a time zone of the first consumer device;
accessing merchant time expression data associated with the merchant server, wherein the merchant time expression data comprises a time of the merchant server and a time zone of the merchant server;
generating and storing a first electronic computer identifier corresponding to the first consumer device based at least in part on the merchant time expression data, the IP address, and the consumer time expression data; and
detecting an electronic communication of a second online transaction between a second consumer device and the merchant server via the merchant website; and
based on the detecting of the electronic communication of the second online transaction:
identifying a second electronic computer identifier corresponding to the second consumer device; and
determining that the first electronic computer identifier matches with the second electronic computer identifier based at least in part on one or more of the plurality of matching parameters; and
communicating the determination of the match to the merchant server.

2. The non-transitory computer storage of claim 1, wherein each of the consumer device time expression data and the merchant server time expression data includes a time in hours, minutes, or seconds and a time zone.

3. The non-transitory computer storage of claim 1, wherein the consumer time expression data or the merchant time expression data is in a military time format.

4. The non-transitory computer storage of claim 1, wherein the one or more computer-executable instructions further cause the one or more processors to perform a step of:
calculating a first level of fraud risk for the first online transaction based at least in part on an analysis of the IP address using a first weight value and an analysis of the consumer time expression data using a second weight value.

5. The non-transitory computer storage of claim 4, wherein the computer-executable instructions further cause the one or more processors perform a step of:
determining that the first online transaction is fraudulent based on a comparison of the first level of risk to a predetermined threshold value.

6. A computerized method for automated real-time fraud detection for an online transaction between a consumer and a merchant, the computerized method comprising:
receiving and storing, by a merchant server, a plurality of matching parameters;
detecting, by the merchant server, an electronic communication of a first online transaction between a first consumer device and the merchant server via a merchant website;
based on the detecting of the electronic communication of the first online transaction:
receiving, by the merchant server, an IP address of the first consumer device;
capturing, by the merchant server, consumer time expression data associated with the first consumer device, wherein the consumer time expression data comprises a time of the first consumer device and a time zone of the first consumer device;
accessing, by the merchant server, merchant time expression data associated with the merchant server wherein the merchant time expression data comprises a time of the merchant server and a time zone of the merchant server;
generating and storing, by the merchant server, a first electronic computer identifier corresponding to the first consumer device based at least in part on the merchant time expression data, the IP address, and the consumer time expression data; and
detecting, by the merchant server, an electronic communication of a second online transaction between a second consumer device and the merchant server via the merchant website; and
based on the detecting of the electronic communication of the second online transaction:
identifying, by the merchant server, a second electronic computer identifier corresponding to the second consumer device; and
determining, by the merchant server, that the first electronic computer identifier matches with the second electronic computer identifier based at least in part on one or more of the plurality of matching parameters; and
communicating the determination of the match to a component within the merchant server.

7. The computerized method of claim 6, wherein each of the consumer time expression data and the merchant time expression data includes two or more temporal components.

8. The computerized method of claim 7, wherein the temporal components include a time in hours, minutes, or seconds and a time zone.

9. The computerized method of claim 6, wherein the consumer time expression data or the merchant time expression data is in a military time format.

10. The computerized method of claim 6, wherein the consumer time expression data of the first consumer device, and wherein the first merchant time expression data and the second merchant time expression data of the merchant website server.

11. The computerized method of claim 6, wherein generating the first electronic computer identifier further comprising determining a clock skew of the first consumer device.

12. The computerized method of claim 6, further comprising calculating, by the merchant server, a first level of fraud risk for the first online transaction based at least in part on at least:
an analysis of the first consumer IP address using a first weight value; and
an analysis of the first consumer device time expression using a second weight value.

13. The computerized method of claim 12, further comprising determining, by the merchant server, that the first online transaction is fraudulent based on a comparison of the first level of fraud risk to a predetermined threshold value.

14. The computerized method of claim 12, wherein the second weight value is based at least on a skew of a difference between the first consumer device time and the first merchant time.

15. A system for real-time fraud detection for an online transaction between a consumer and a merchant, the system comprising:
- a processor of a merchant server;
- a network interface configured to communicate with a plurality of consumer devices and a server; and
- a memory storing computer-executable instructions that, when executed by the processor, cause the processor of the merchant server to perform the steps of:
    - receiving and storing a plurality of matching parameters;
    - detecting an electronic communication of a first online transaction between a first consumer device and the merchant server via a merchant website;
    - based on the detecting of the electronic communication of the first online transaction:
        - receiving an IP address of the first consumer device;
        - capturing consumer time expression data associated with the first consumer device, wherein the consumer time expression data comprises a time of the first consumer device and a time zone of the first consumer device;
        - accessing merchant time expression data associated with the merchant server, wherein the merchant time expression data comprises a time of the merchant server and a time zone of the merchant server;
        - generating and storing a first electronic computer identifier corresponding to the first consumer device based at least in part on the merchant time expression data, the IP address, and the consumer time expression data; and
        - detecting an electronic communication of a second online transaction between a second consumer device and the merchant server via the merchant website; and
    - based on the detecting of the electronic communication of the second online transaction:
        - identifying a second electronic computer identifier corresponding to the second consumer device; and
        - determining that the first electronic computer identifier matches with the second electronic computer identifier based at least in part on one or more of the plurality of matching parameters; and
        - communicating the determination of the match to a component within the merchant server.

16. The system of claim 15, wherein each of the consumer time expression data and the merchant time expression data includes two or more temporal components.

17. The system of claim 16, wherein the temporal components include a time in hours, minutes, or seconds and a time zone.

18. The system of claim 15, wherein the consumer time expression data or the merchant time expression data is in a military time zone format.

19. The system of claim 15, wherein the consumer time expression data of the first consumer device, and wherein the merchant time expression data of the merchant server.

20. The system of claim 15, wherein the computer-executable instructions further cause the processor to perform a step of: calculating a first level of fraud risk for the first online transaction based on at least:
- an analysis of the IP address using a first weight value; and
- an analysis of the consumer time expression using a second weight value.

* * * * *